United States Patent [19]

Fox

[11] Patent Number: 4,616,736

[45] Date of Patent: Oct. 14, 1986

[54] OIL SYSTEM FOR CONTIGUOUS GEAR BOXES

[75] Inventor: Charles H. Fox, Greenville, Ohio

[73] Assignee: Dresser Industries, Inc., Dallas, Tex.

[21] Appl. No.: 758,782

[22] Filed: Jul. 25, 1985

[51] Int. Cl.[4] ............................................. F01M 9/06
[52] U.S. Cl. .................................... 184/6.12; 184/11.2
[58] Field of Search ................... 184/6.12, 11.1, 11.2, 184/13.1; 74/467, 468; 299/76, 79

[56] References Cited

U.S. PATENT DOCUMENTS

| 2,027,012 | 1/1936 | Barnes | 184/13.1 |
| 2,242,195 | 5/1941 | Teker et al. | 184/11.1 |
| 2,842,226 | 7/1958 | Liebel | 184/6.12 |
| 2,950,943 | 8/1960 | Forrest | 184/13.1 X |
| 2,968,190 | 1/1961 | Orr | 184/6.12 X |
| 3,214,989 | 11/1965 | Wellauer et al. | 184/6.12 X |
| 3,259,210 | 7/1966 | Beebe et al. | |
| 3,362,753 | 1/1968 | Sibley | |
| 3,499,503 | 3/1970 | Murray | 184/11.1 X |
| 4,162,104 | 7/1979 | Kogler et al. | |
| 4,344,507 | 8/1982 | Osborne | |
| 4,352,301 | 10/1982 | Fleury | 74/710 X |

FOREIGN PATENT DOCUMENTS

| 825359 | 3/1952 | Fed. Rep. of Germany | 184/11.2 |
| 345398 | 12/1936 | Italy | 184/11.2 |
| 634971 | 3/1950 | United Kingdom | 184/6.12 |

Primary Examiner—Leonard E. Smith

[57] ABSTRACT

An improved lubricating system for contiguous gear cases which utilizes only one oil supply, circulates the oil between the two cases, and enables the temperature of the oil in the smaller gear case to be decreased thus prolonging the life of the bearings and gears therein.

5 Claims, 6 Drawing Figures

© 1

OIL SYSTEM FOR CONTIGUOUS GEAR BOXES

BACKGROUND OF THE INVENTION

The present invention relates to a lubricating system used in machines and in particular a lubricating system for contiguous gear boxes.

In machines such as mining machines, a first working element such as an auger head, is driven by a gear case known as an auger gear case. In turn, the auger gear case is coupled to a planetary gear case for coupling power from a source such as a motor to the auger gear case to drive the auger head itself.

In many of these machines the auger gear case and the planetary gear case are contiguous to each other but are separate and distinct cases insofar as the lubrication system is concerned. Thus, the auger gear case has its own lubricating system and the planetary gear case has its own lubricating system. This requires, of course, that lubricant be added to each of the cases individually as needed and that the operator must check the lubricant level in each of the cases separately. In addition, the gears in the planetary gear case are very compact and thus the planetary gear case is smaller in volume than the auger gear case. The planetary gear case, therefore, contains much less lubricant than the auger gear case. This means that since the planetary gear case is absorbing the power from the motor source to the auger gear case and because these motors are very large and can generate several hundred horsepower, a great deal of heat is generated in the planetary gear case. Under these conditions the lubricant system must be checked often not only for supply but also for temperature and because the temperature is high, failure of parts is greater than would occur if the lubricant were at a lower temperature.

It is an object of the present invention to overcome the foregoing disadvantages by providing contiguous gear cases which utilize the same lubricating system which allows the larger volume of lubricant in one gear case to flow through the smaller gear case thus allowing the smaller gear case to operate at a lower temperature.

It is also an object of the present invention to provide a lubricant pump in one of said gear cases for causing a pumping action of the lubricant thereby enabling circulation of the lubricant between the two cases.

It is yet another object of the present invention to provide an improved lubricating system in which an oil outlet passage is formed in one of said gear cases adjacent a rotatable carrier having vanes thereon which distributes oil toward the outlet passage and in which a projection is formed adjacent the oil outlet passage for forming a dam to catch the oil distributed by the vanes to force the oil out of the oil outlet passage thereby creating a pumping action.

It is still another object of the present invention to convey the pumped oil externally from one of the gear cases to the other to allow a complete circulation path.

SUMMARY OF THE INVENTION

Thus, the present invention provides an improved lubrication system in a machine having a gear train in a first gear case contiguous to but separated by a wall from and driven by a gear train in a smaller second gear case, each gear case having a separate lubrication system, the improved lubrication system comprising an oil passage formed in said wall between and coupling said first gear case to said contiguous second gear case, an oil outlet passage formed in said second gear case, an oil inlet passage formed in said first gear case, oil carrier means connecting said second gear case oil outlet passage externally of said gear cases to said oil inlet passage of said first gear case, and oil pumping means internally of one of said gear boxes for causing said oil to flow from one of said gear boxes to the other and through said external connecting means whereby oil from a single oil supply is circulated between said gear boxes thereby eliminating the need for two separate oil supplies and enabling the oil in said second gear box to achieve lower operating temperatures than when operated with a separate oil supply.

The invention also relates to an improved method of lubrication in a machine having a gear train in a first gear case contiguous to but separated by a wall from and driven by a gear train in a smaller second gear case, each case having a separate lubrication system, the improved method comprising the steps of forming an oil passage in said wall between and coupling said first gear case to said second contiguous gear case, forming an oil outlet passage in said second gear case, forming an oil inlet passage in said first gear case, connecting said second gear case outlet oil passage to said oil inlet passage of said first gear case externally of said gear cases with an oil carrier means, and causing said oil to flow from one of said gear boxes to the other and through said external connecting means whereby oil from a single oil supply is circulated between said gear boxes thereby eliminating the need for two separate oil supplies and enabling the oil in said second gear box to achieve lower operating temperatures than when operated with a separate oil supply.

BRIEF DESCRIPTION OF THE DRAWINGS

Further objects and advantages of the present invention will become apparent from a consideration of the following description in connection with the accompanying drawings in which.

DETAILED DESCRIPTION OF THE DRAWINGS

Figure 1:
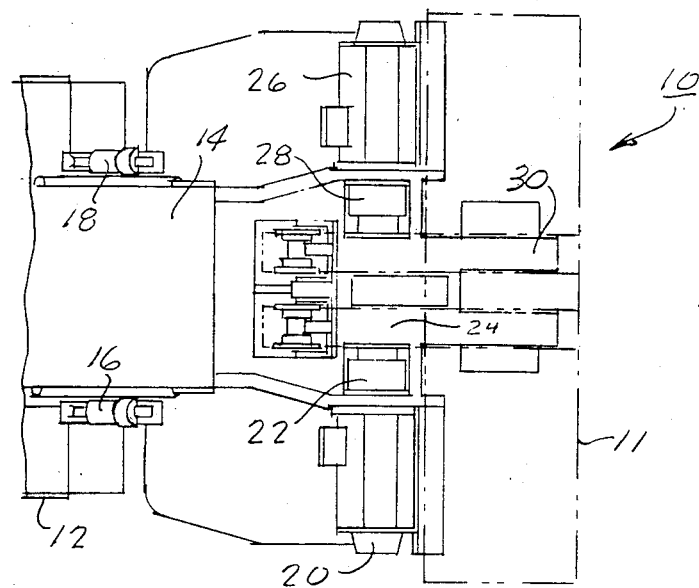
FIG. 1 is a partial view of the front end of a mining machine having contiguous gear boxes which can be modified according to the present invention.

FIG. 1 is a side view of a typical mining machine of the prior art which can be modified to utilize the present invention. The mining machine is generally designated by the numeral 10 and has a rotating cutting head designated by the dashed outline 11. The mining machine 10 is moved or propelled by endless traction treads 12 disposed on each side of the machine. The endless traction treads 12 are driven through a drive transmission by electric motors (not shown). The cutting head 11 is supported on the mining machine 10 by a pivotable frame assembly 14 which extends from a pivot (not shown) to the cutting head 11. There are two hydraulic cylinders 16 and 18 which are connected to the frame assembly 14 to raise and lower cutting head 11 on the outer end thereof. An electric motor 20 drives a planetary gear train 22 which is contiguous to and coupled to an auger gear train 24. The auger gear train 24 has a series of gears which are coupled to and rotate the cutting head 11. A second drive motor 26 is coupled to a planetary gear train 28 which drives a second auger gear train 30 to assist in the rotation of cutting head 11.

In the prior art mining machines, the planetary gear systems 22 and 28 have a self contained lubrication system while the respective contiguous auger gear trains 24 and 30 also have their individual and separate lubricating systems. This means, of course, that the operator of the mining machine 10 must check the oil levels in each of the gear cases separately or, when needed, add lubricant to each of the gear cases separately. In addition, it will be noted that the planetary gear cases 22 and 28 are considerably smaller in volume than the volume of auger gear cases 24 and 30. Inasmuch as drive motors 20 and 26 are of several hundred horsepower in size, tremendous pressures are generated in the planetary gear cases 22 and 28. This, of course, causes the lubricant to heat in gear cases 22 and 28 and consequently the operator must check them frequently to make sure that the bearings and gears do not run too hot inasmuch as damage can be caused if that is the case. It will also be noted that planetary gear case 22 is contiguous to auger gear case 24 while planetary gear case 28 is contiguous to auger gear case 30. Since auger gear cases 24 and 30 have such larger volumes than planetary gear cases 22 and 28, they have a greater oil supply therein and thus the lubricant runs at a much lower temperature than the lubricant in planetary gear cases 22 and 28.

Figure 2:
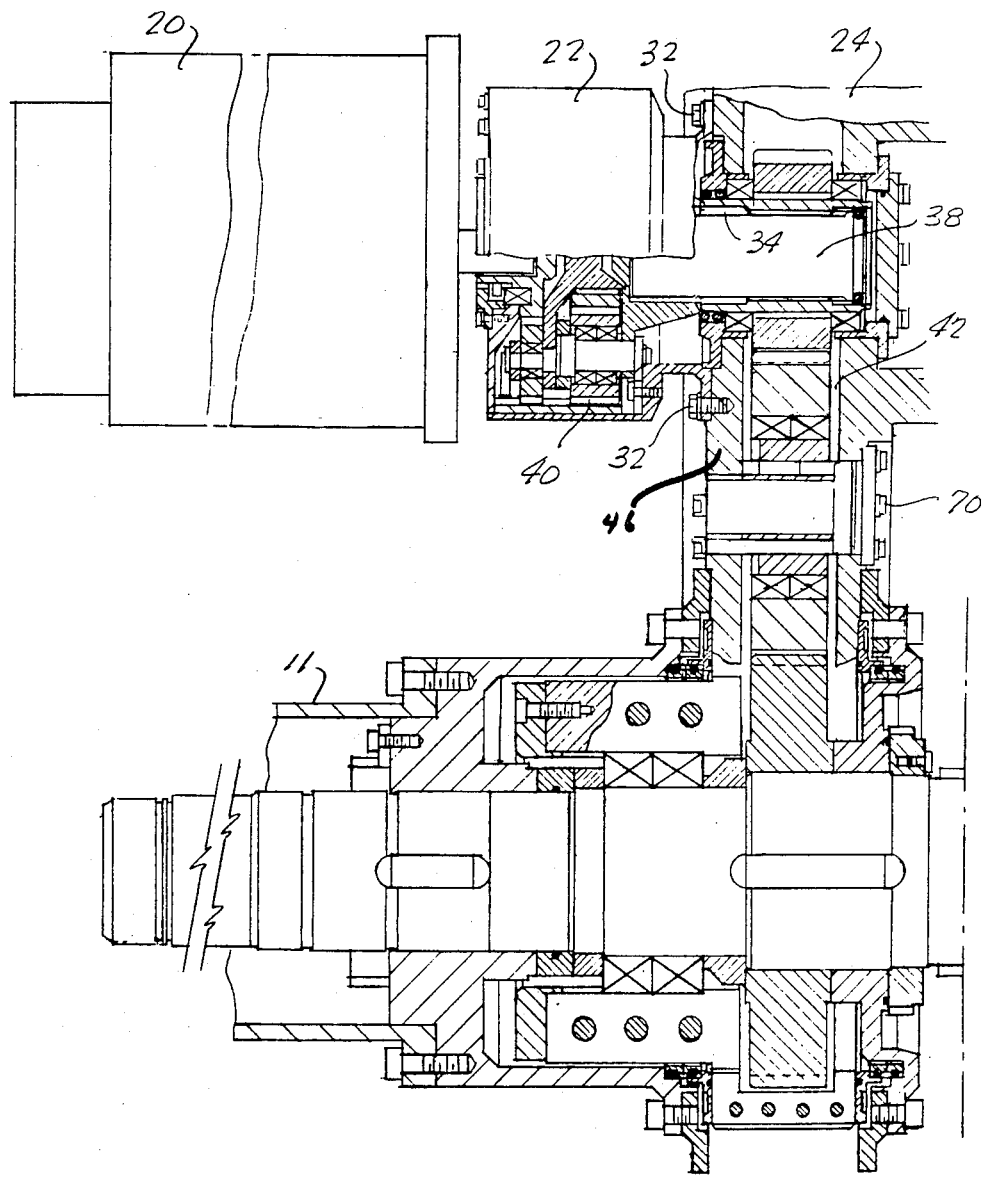
FIG. 2 is a partial cross-sectional view of the prior art existing contiguous gear boxes used with a mining machine.

FIG. 2 discloses a partial cross-sectional view of a portion of the mining machine 10 including one of the drive motors 20, one of the planetary gear cases 22, and one of the contiguous auger gear cases 24 illustrating the manner in which the gear train in gear case 24 drives the rotary shaft for cutter head 11. Thus, as can be seen in FIG. 2, planetary gear case 22 is attached to auger gear case 24 by means of bolts 32. Planetary gear case 22 is a separately contained unit contiguous to auger gear case 24 and is separated therefrom by a common wall 46 even though shaft 38 is driven by planetary gear case 22 and extends into auger gear case 24 to drive that gear train which couples power to auger head 11 to rotate it. Thus, the oil or lubricant in planetary gear case 22 is represented at 40 as being throughout the gear case 22 while the self contained lubricating oil supply 42 in auger gear case 24 extends along the gear train down into the rotary cutting head 11. As can be seen in FIG. 2, the volume of oil in the auger gear case 24 is considerably larger than that in planetary gear case 22 because of the difference in volumes of the gear cases that must be lubricated.

Figure 3:
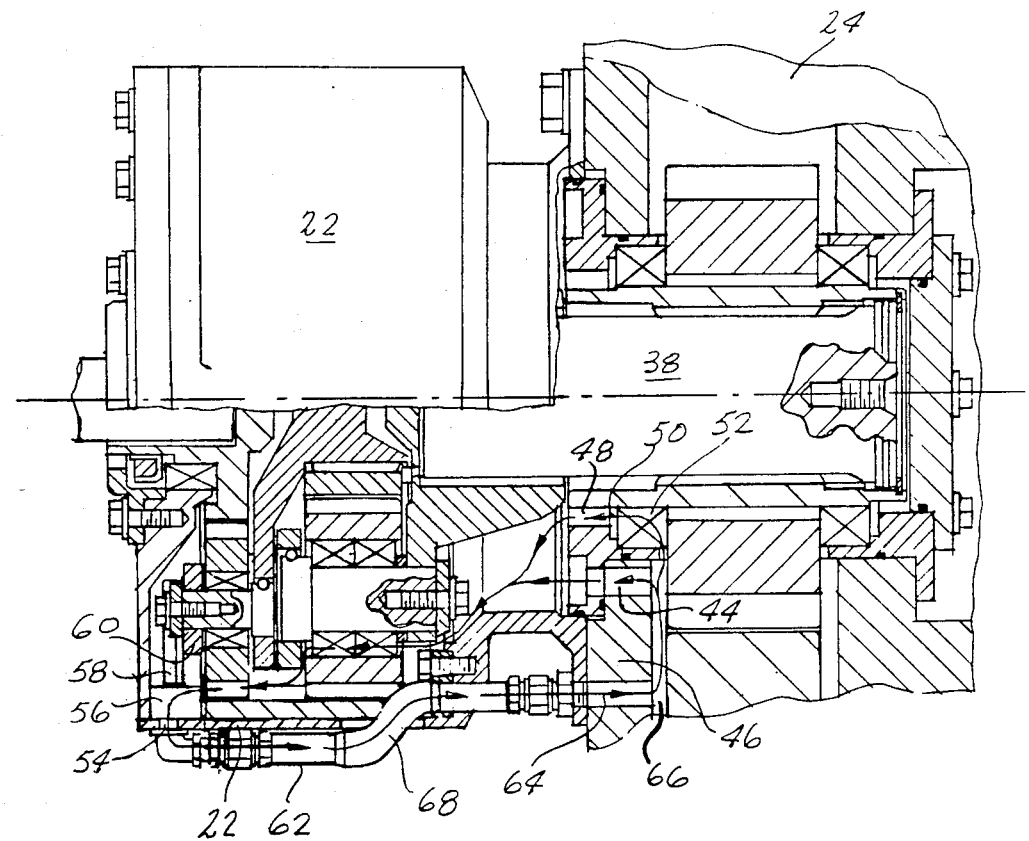
FIG. 3 is a partial cross-sectional view of the contiguous gear boxes shown in FIG. 2 which are modified according to the present invention.

FIG. 3 is an expanded partial cross-sectional view of the planetary gear case 22 and the auger gear case 24 illustrating how the contiguous cases can be modified to use a single oil supply to lubricate both gear cases 22 and 24. Thus, as can be seen in FIG. 3, a first oil passage 44 is formed in wall 46 separating and coupling the first planetary gear case 22 to the second auger gear case 24. Also, an oil passage 48 is formed in wall 50 separating the bearing 52 in auger gear case 24 from the interior of the planetary gear case 22. These oil passages 44 and 48 will allow the oil in auger gear case 24 to flow into the planetary gear case 22 while lubricating bearing 52.

In addition, an oil outlet orifice 54 is formed in the planetary gear case 22 at a location remote from first oil passage 44 and a projection 56 is formed on the inner periphery adjacent to and circumferentially following the oil outlet orifice 54 in the direction of gear rotation in planetary gear case 22 for forming a dam to catch oil which is distributed by vanes or paddles 58 which are mounted on high speed planetary gear carrier 60. Planetary gear carrier 60 is, of course, being rotated within the planetary gear housing 22 so as to distribute the lubricant throughout the casing or housing 22. As the oil leaves the outer ends of vanes 58 radially in the vicinity of projection 56 which is located radially adjacent the vanes 58, projection 56 gathers the oil and generates a pressure head which forces the oil out through orifice 54 into an oil carrying tube 62 which connects the planetary gear case 22 outlet oil orifice 54 externally of said gear cases 22 and 24 to the oil inlet aperture 64 which is formed in auger gear case 24.

Thus, as high speed planetary gear carrier 60 rotates to distribute oil throughout the planetary gear housing 22, the projection 56 catches the oil leaving the outer ends of vanes 58 in a radial direction and forces it out through orifice 54 into external tube 62 through oil aperture 64 in the housing 66 of the auger gear case 24 and back into the oil supply of auger gear case 24. Because oil outlet orifice 54 is located remotely from oil passage 44, oil must travel across the entire case 22 thereby ensuring complete circulation throughout casing 22. Since auger gear case 24 has such a much larger oil supply, the circulation of the oil as shown by the arrows 68 in FIG. 3 causes a significant reduction in the oil temperature being circulated through planetary gear housing 22. In addition, of course, there is only one oil supply which now is utilized by both planetary gear housing 22 and auger gear housing 24. Thus, by removing a single pipe plug 70 in the auger gear case 24 as shown in FIG. 2, the oil level can be checked for both the auger gear housing 24 and the planetary gear housing 22. In addition, of course, if oil is needed it can be added in a common location for both gear casings 22 and 24 such as a port created by the removal of pipe plug 70.

Figure 4:
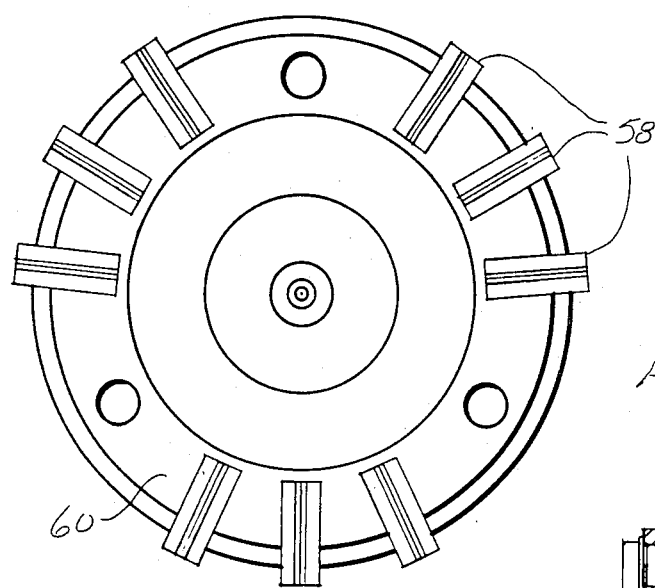
FIG. 4 is a side view of a rotating oil carrier having vanes thereon which can be used as lubricant pump in the present invention.

The planetary gear carrier 60 is illustrated in FIG. 4 with vanes or paddles 58 mounted thereon in order to pick up the oil and distribute it within the casing of the planetary gear 22 as well as delivering it to projection or dam 56 to generate a pressure head for circulating the oil between the two contiguous gear cases 22 and 24.

Figure 5:
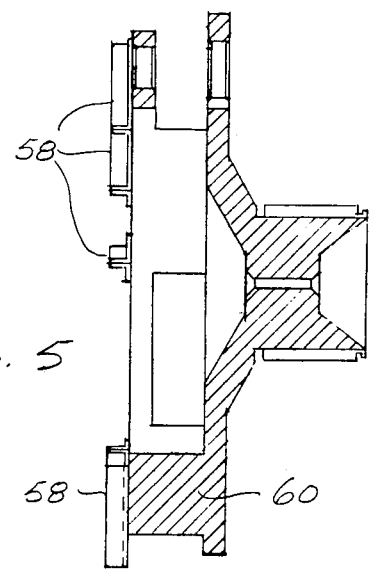
FIG. 5 is a cross-sectional view of the rotatable carrier of FIG. 4 illustrating the manner in which the vanes are attached thereto.

FIG. 5 is a cross-sectional view of the planetary gear carrier 60 illustrating the vanes 58 thereon.

Figure 6:
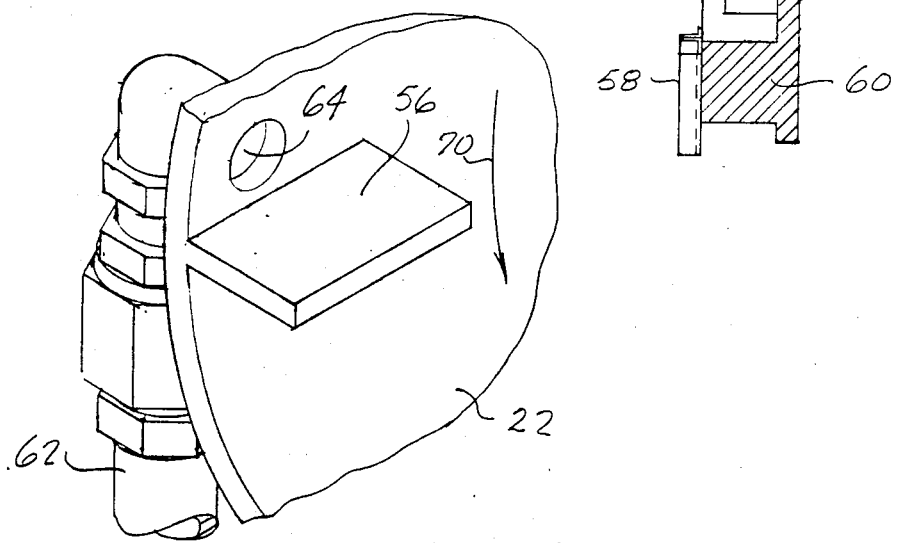
FIG. 6 is a partial cross-sectional view of a gear casing having an outlet orifice therein and a projection adjacent thereto to form a dam for catching oil being distributed by the rotating carrier of FIG. 4 to cause a pumping action and force lubricant through both of the contiguous gear cases.

The operation of the oil pump used to circulate the oil between the planetary gear casing 22 and the auger gear casing 24 is illustrated in FIG. 6. When the high speed planetary gear carrier 60 is rotating in the direction shown by arrow 70 in FIG. 6, the oil being carried by vanes 58 is caught by projection or dam 56 which builds up a pressure head that forces the oil out through orifice or oil passage 58 into external pipe 62 which couples the oil back to the auger gear casing 24 as illustrated in FIG. 3. Thus, by adding projection 56 an oil pump is formed in conjunction with the planetary gear carrier 60 which is already in the casing 22 to distribute oil therein.

Thus, there has been disclosed a novel improved lubrication system for contiguous gear cases which normally have separate lubrication systems. Not only does the temperature of the lubricating oil decrease in the planetary gear housing thereby increasing the life of the gears, but also only one source of oil is required rather than individual sources in each of the planetary and auger gear housings. Also, of course, the level of the lubricating oil can be checked for both chambers in both gear housings in one location and oil added as necessary in a common location.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined in the appended claims.

I claim:

1. In a machine having gears in a first gear case contiguous to but separated by a common wall from and driven by gears in a smaller second gear case, an improved method of lubrication comprising the steps of:
   a. forming an oil passage in said common wall between said first gear case and said contiguous second gear case,
   b. forming an oil orifice in said second gear case remote from said wall oil passage,
   c. forming an oil aperture in said first gear case,
   d. connecting said second gear case oil orifice to said oil aperture of said first gear case externally of said gear cases,
   e. forming a rotatable carrier in said second gear case, the periphery of which is adjacent to said oil orifice,
   f. mounting a plurality of vanes on said carrier having outer ends for distributing oil throughout said second gear case, and
   g. forming an internal projection on the inner periphery of said second gear case radially adjacent said outer ends of said vanes and adjacent to and circumferentially following said oil orifice for forming a dam to catch oil distributed by said vanes to create a pressure head and force said oil out of said oil orifice thereby creating a pumping action which circulates said oil between said first and second gear cases through said external oil connection means and said oil passage coupling said first gear case to said second gear case whereby oil from a single oil supply is circulated between said gear boxes thereby eliminating the need for two separate oil supplies and enabling the oil in said second gear box to achieve lower operating temperatures than when operated with a separate oil supply.

2. An improved lubrication system as in claim 1 further comprising the steps of forming a single port means in one of said gear cases for adding oil as necessary for both said planetary gear case and said auger gear case, and for checking the oil level in both said planetary gear case and said auger gear case.

3. In a machine having gears in a first gear case contiguous to but separated by a common wall from and driven by gears in a smaller second gear case, an improved lubrication system comprising:
   a. an oil passage formed in said common wall between and coupling said first gear case to said contiguous second gear case,
   b. an oil orifice formed in said second gear case at a location remote from said wall oil passage,
   c. an oil aperture formed in said first gear case,
   d. means for connecting said second gear case oil orifice externally of said gear cases to said oil aperture of said first gear case,
   e. a rotatable carrier in said second gear case, the periphery of which is adjacent to said oil orifice,
   f. a plurality of vanes mounted on said carrier and having outer ends for distributing oil throughout said second gear case, and
   g. a projection formed on the inner periphery of said second gear case radially adjacent said outer ends of said vanes and adjacent to and circumferentially following said oil orifice in the direction of gear rotation for forming a dam to catch oil distributed by said vanes to create a pressure head and force said oil out said oil orifice thereby creating a pumping action which circulates said oil between said first and second gear cases from said oil orifice through said external oil connecting means to said oil aperture and back through said oil passage coupling said first gear case to said second gear case whereby oil from a single oil supply is circulated between said gear boxes thereby eliminating the need for two separate oil supplies and enabling the oil in said second smaller gear box to achieve lower operating temperatures than when operated with a separate oil supply.

4. The improved lubrication system of claim 3 wherein:
   a. said first gear case is an auger gear case, and
   b. said second gear case is a planetary gear case containing gears being driven by gears in said auger gear case.

5. The improved lubrication system of claim 4 further including a single port means in one of said gear cases for adding oil as necessary for both said planetary gear case and said auger gear case, and for checking the oil level in both said planetary gear case and said auger gear case.

* * * * *